UNITED STATES PATENT OFFICE.

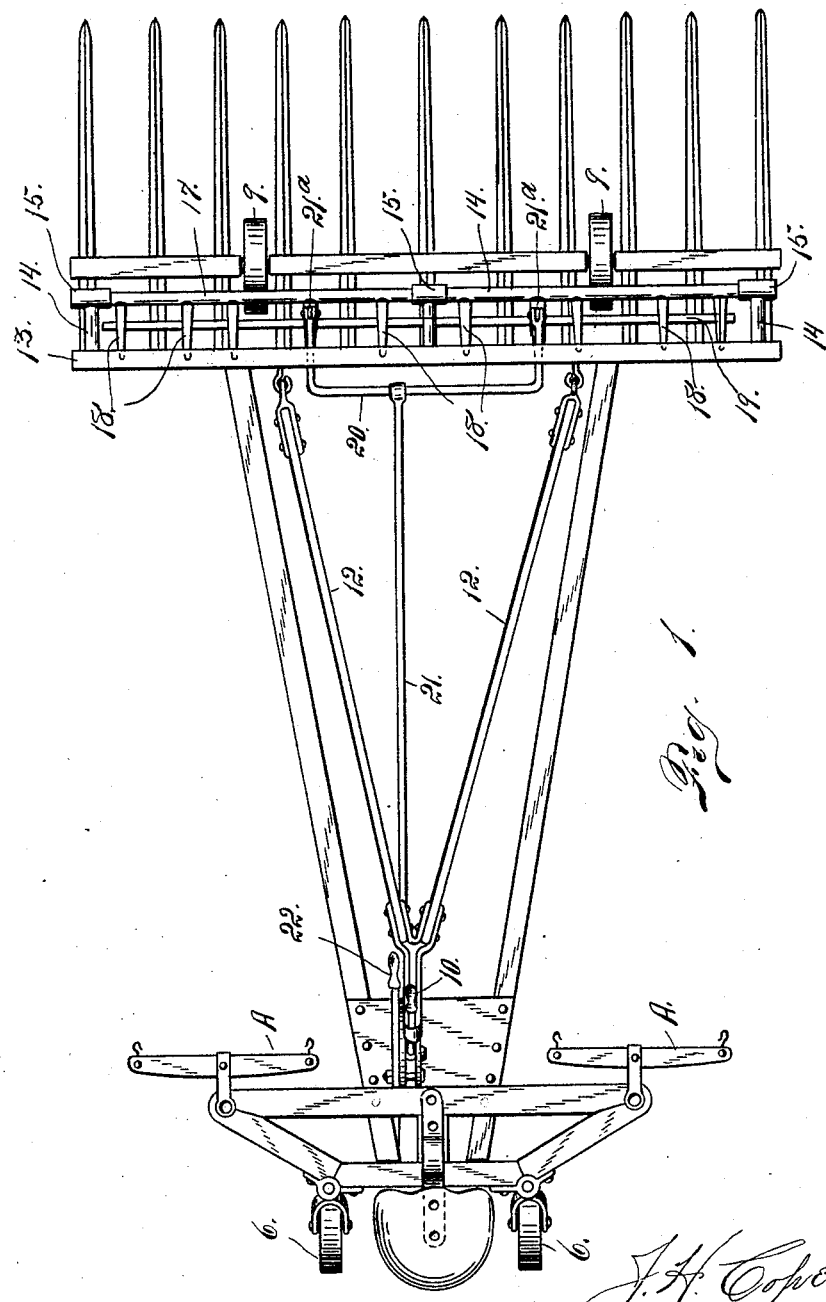

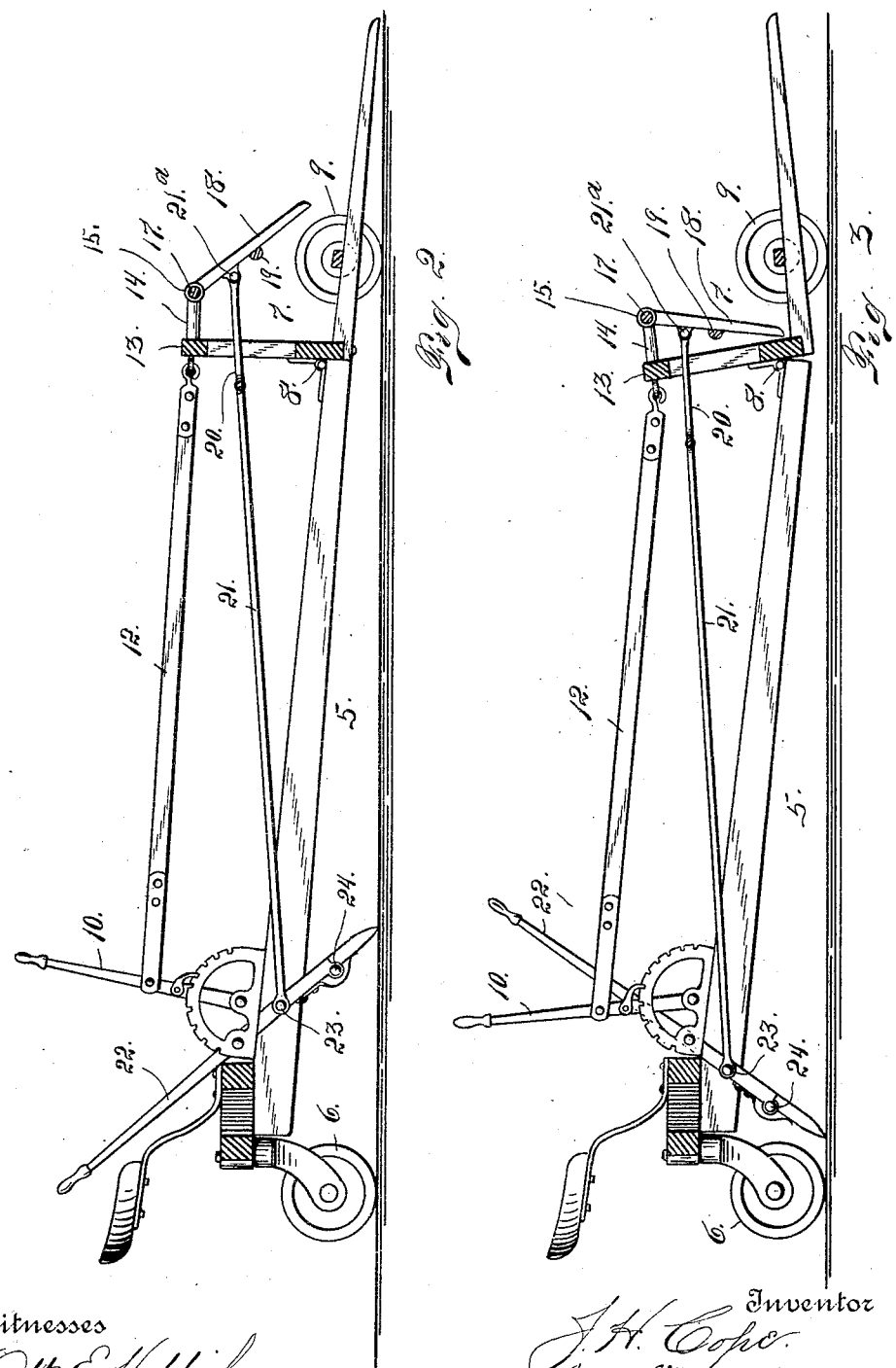

JOSEPH H. COPE, OF WINDSOR, COLORADO.

HAY-RAKE.

No. 891,148.   Specification of Letters Patent.   Patented June 16, 1908.

Application filed October 7, 1905. Serial No. 281,837.

*To all whom it may concern:*

Be it known that I, JOSEPH H. COPE, a citizen of the United States, residing at Windsor, in the county of Weld and State of Colorado, have invented certain new and useful Improvements in Hay-Rakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in hay rakes and my object is to facilitate the removal of the hay or other similar material from the rake head when it becomes desirous to do so.

Heretofore so far as I am aware the rake is first loaded with hay and conveyed to the stacker, the rake head being stopped with its head in suitable proximity to the stacker head. The team is then backed whereby the rake is moved rearwardly for the purpose of disengaging the rake head from its load. In actual practice it is found that the hay sticks to the rake head during the rearward movement of the rake often times requiring some one to aid in holding the hay in order to allow the rearwardly moving head to become disengaged therefrom.

My object is to overcome this difficulty and to provide a device which may be operated either automatically or by hand, whereby the load of hay upon the rake head is given a forward movement simultaneously with the rearward movement of the machine, whereby the load is readily disengaged from the rake head and thrown upon the stacker head.

Having briefly outlined my improved construction as well as the function it is intended to perform, I will proceed to describe the same in detail reference being made to the accompanying drawing in which is illustrated an embodiment thereof.

In this drawing, Figure 1 is a top plan view of a rake equipped with my improvements. Fig. 2 is a sectional elevation of the same. Fig. 3 is a similar view showing the parts in different relative positions.

The same reference characters indicate the same parts in all the views.

Let the numeral 5 designate the frame work of the rake whose rear extremity is mounted on caster wheels 6. To the forward extremity of this frame is hinged the rake head 7 as shown at 8. This rake head is mounted on wheels 9 and is adjustable from the position shown in Fig. 2 to the position shown in Fig. 3 through the instrumentality of a hand lever 10 and bars or rods 12 connected therewith. The position of the rake head as shown in Fig. 2 is proper when collecting the hay upon the head. After the load has accumulated, the head is thrown to the position shown in Fig. 3 while driving to the stacker, in order to hold the hay above the ground.

The upper rail 13 of the rake head is provided with a number of forward projections 14 having bearing sleeves 15 in which is journaled a shaft 17 provided with depending pusher arms or teeth 18 which are connected by a stiffening bar 19. A U-shaped yoke 20 is connected at 21$^a$ with ears formed on two of the pusher arms 18. To this yoke 20 is connected a rearwardly extending rod 21 which is pivotally connected with a lever 22 as shown at 23, its lower extremity being adapted to automatically engage the ground when the rake is moved rearwardly. The lower arm of this lever is jointed as shown at 24, the two parts being normally held in alinement. The lower part of the lever is adapted to swing rearwardly during the forward movement of the machine, while during the movement of the machine in the opposite direction, the lower member will catch in the ground and throw the pusher head to the position shown in Fig. 2 whereby the hay or other material is discharged from the rake head during the rearward movement of the rake.

From the foregoing description the use and operation of my improved device will be readily understood. While collecting the hay the rake head is in the position shown in Fig. 2 and the pusher head in the position shown in Fig. 3. As soon as the load of hay is collected upon the rake head, the head is tilted to the position shown in Fig. 3 through the instrumentality of the hand lever 10 and the connecting rods 12. It may be stated that the rake is drawn by two horses hitched to the whiffle trees A as shown in Fig. 1, the rake head being in front of the horses when the machine is in use. After the rake head is tilted as aforesaid the team is driven to the stacker, the rake being stopped so tl the rake head 7 is in suitable proximity to stacker head (not shown). The rake head is again thrown to the position shown in Fig. 2, and the rake is moved rearwardly by backing the horses or team hitched thereto. During this rearward action the lower extremity of the lever 22, the said lever being in the position shown in Fig. 3, catches in the earth causing the said lever and its connections to be thrown to the position shown in Fig. 2, thus throwing the pusher head to the position shown in Fig. 2 and discharging the hay from the rake head to the stacker head (not shown).

It is not essential that the load should be thrown entirely from the rake head by the use of the pusher mechanism. This, however, may be done if desired by arranging the lever 22 in such a manner as to give the desired leverage, and then operating the same by hand. In this case the hinged lower extremity of the lever will be omitted and the lever would swing freely above the surface of the earth, the pushing action being acquired through the instrumentality of the person in charge of the machine.

In the construction shown in the drawing the pusher is only intended to act on the load carried by the rake head, sufficiently to prevent the hay from sticking to the head and thus causing the load to be freed from the head during the rearward movement of the machine.

Having thus described my invention, what I claim is:

1. The combination with a rake of the class described, of a pusher device pivotally mounted on the rake head, a lever fulcrumed on the frame of the rake, and a suitable connection between the lever and the pusher whereby the movement of the lever actuates the pusher for the purpose set forth.

2. The combination with a rake of the class described, of a pusher head pivotally connected with the upper part of the rake head, a lever fulcrumed on the rake and whose lower extremity is adapted to catch in the surface of the earth as the rake is moved rearwardly, and a suitable connection between the lever and the pusher head whereby as the lower extremity of the lever catches in the earth as aforesaid the pusher head is automatically thrust forwardly for the purpose set forth.

In testimony whereof I affix my signature in presence of two witnesses.

JOSEPH H. COPE.

Witnesses:
F. E. BONIFIELD,
J. K. KENNEDY.